(12) United States Patent
Soriaga et al.

(10) Patent No.: US 11,071,078 B2
(45) Date of Patent: Jul. 20, 2021

(54) DISCOVERY AND SYNCHRONIZATION CHANNELS FOR USER-TRACKING ZONES IN A CELLULAR NETWORK

(71) Applicant: QUALCOMM Incorporated, San Diego, CA (US)

(72) Inventors: Joseph Binamira Soriaga, San Diego, CA (US); Tingfang Ji, San Diego, CA (US); Yichao Huang, San Diego, CA (US); Naga Bhushan, San Diego, CA (US); Gavin Bernard Horn, La Jolla, CA (US); Keiichi Kubota, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/704,747

(22) Filed: Dec. 5, 2019

(65) Prior Publication Data

US 2020/0120628 A1   Apr. 16, 2020

Related U.S. Application Data

(62) Division of application No. 14/957,250, filed on Dec. 2, 2015, now Pat. No. 10,542,507.
(Continued)

(51) Int. Cl.
*H04W 56/00* (2009.01)
*H04W 48/10* (2009.01)
(Continued)

(52) U.S. Cl.
CPC ....... *H04W 56/0015* (2013.01); *H04L 1/0047* (2013.01); *H04W 8/005* (2013.01);
(Continued)

(58) Field of Classification Search
CPC . H04L 5/0051; H04L 25/0226; H04L 1/0045; H04L 1/0047; H04L 1/0072;
(Continued)

(56) References Cited

U.S. PATENT DOCUMENTS 5,940,743 A    8/1999 Sunay et al.
8,909,244 B2   12/2014 Curticapean
(Continued)

FOREIGN PATENT DOCUMENTS

CN    101094483 A    12/2007
CN    101207844 A    6/2008
(Continued)

OTHER PUBLICATIONS

International Preliminary Report on Patentability—PCT/US2016/021703, The International Bureau of WIPO—Geneva, Switzerland, dated Feb. 22, 2017.
(Continued)

*Primary Examiner* — Michael Thier
*Assistant Examiner* — Prince A Mensah
(74) *Attorney, Agent, or Firm* — Norton Rose Fulbright US LLP

(57) ABSTRACT

Discovery and synchronization channels are discussed for user-tracking zones in a cellular network. User-tracking zones reduce the mobility tracking burden on the UE and shift the tracking responsibility to the network. This shift allows for UE and network power savings from reduced searching at the UE as well as through efficient paging area tracking and less broadcast signaling. The various aspects provide channel design for initial synchronization and discovery of the user-tracking zones. A single frequency network (SFN) synchronization channel is provided with at least a reference signal for time synchronization and payload information that may include a zone identifier (ID), format-
(Continued)

ting for a system information transmission request, and resource allocation for the request. The zone ID may be included in the payload or embedded into the reference signal. Facility is also provided for handling zone nodes of different power classes that allows for maintaining the SFN operations.

24 Claims, 14 Drawing Sheets

Related U.S. Application Data

(60) Provisional application No. 62/133,064, filed on Mar. 13, 2015.

(51) Int. Cl.
*H04W 72/04* (2009.01)
*H04L 1/00* (2006.01)
*H04W 8/00* (2009.01)
*H04W 48/16* (2009.01)

(52) U.S. Cl.
CPC ......... *H04W 48/10* (2013.01); *H04W 56/001* (2013.01); *H04W 72/042* (2013.01); *H04W 48/16* (2013.01); *Y02D 30/70* (2020.08)

(58) Field of Classification Search
CPC ....... H04W 4/02; H04W 16/26; H04W 48/16; H04W 56/0005; H04W 56/15; H04W 72/042; H04W 72/1284; H04W 74/004
See application file for complete search history.

(56) References Cited

U.S. PATENT DOCUMENTS

| | | | |
|---|---|---|---|
| 9,924,498 | B2 | 3/2018 | Chen et al. |
| 2002/0098860 | A1 | 7/2002 | Pecen et al. |
| 2008/0181194 | A1 | 7/2008 | Lindoff et al. |
| 2008/0316961 | A1 | 12/2008 | Bertrand et al. |
| 2009/0175159 | A1 | 7/2009 | Bertrand et al. |
| 2009/0316641 | A1 | 12/2009 | Yamada et al. |
| 2010/0272004 | A1* | 10/2010 | Maeda .............. H04W 72/0466 370/312 |
| 2011/0034181 | A1 | 2/2011 | Jagetiya et al. |
| 2011/0268050 | A1 | 11/2011 | Farajidana et al. |
| 2012/0033628 | A1 | 2/2012 | Eriksson et al. |
| 2012/0155362 | A1 | 6/2012 | Montojo et al. |
| 2012/0213108 | A1 | 8/2012 | Ji et al. |
| 2012/0213109 | A1 | 8/2012 | Xu et al. |
| 2013/0109380 | A1 | 5/2013 | Centonza et al. |
| 2014/0056220 | A1 | 2/2014 | Poitau et al. |
| 2014/0126519 | A1 | 5/2014 | Chun et al. |
| 2014/0171073 | A1 | 6/2014 | Kim et al. |
| 2014/0226638 | A1 | 8/2014 | Xu et al. |
| 2014/0334399 | A1 | 11/2014 | Xu et al. |
| 2015/0016419 | A1 | 1/2015 | Kim et al. |
| 2015/0029931 | A1 | 1/2015 | Ryu et al. |
| 2015/0289141 | A1* | 10/2015 | Ghasemzadeh ....... H04W 16/14 370/330 |
| 2016/0234045 | A1 | 8/2016 | Lindoff et al. |
| 2016/0270013 | A1 | 9/2016 | Soriaga et al. |
| 2020/0120628 | A1 | 4/2020 | Soriaga et al. |
| 2020/0178193 | A1 | 6/2020 | Soriaga et al. |

FOREIGN PATENT DOCUMENTS

| | | | |
|---|---|---|---|
| CN | 101227706 A | 7/2008 | |
| JP | 2004514356 A | 5/2004 | |
| WO | WO-2012116022 A1 | 8/2012 | |
| WO | WO-2013138389 A2 | 9/2013 | |
| WO | WO-2014113537 A1 * | 7/2014 | ............ H04W 72/02 |
| WO | WO-2015020591 A1 | 2/2015 | |

OTHER PUBLICATIONS

International Search Report and Written Opinion—PCT/US2016/021703—ISA/EPO—dated Jun. 22, 2016.
NEC: "Further Clarification of on-Demand S-BCH", 3GPP TSG-RAN WG2#56, R2-063090, Nov. 10, 2006, pp. 1-5.
Overview of High-speed, Large-capacity, and Low-delay LTE Wireless System, NTT Docomo Technical Journal vol. 10 No. 1, Apr. 30, 2011.
Taiwan Search Report—TW105107354—TIPO—dated Dec. 16, 2019.

* cited by examiner

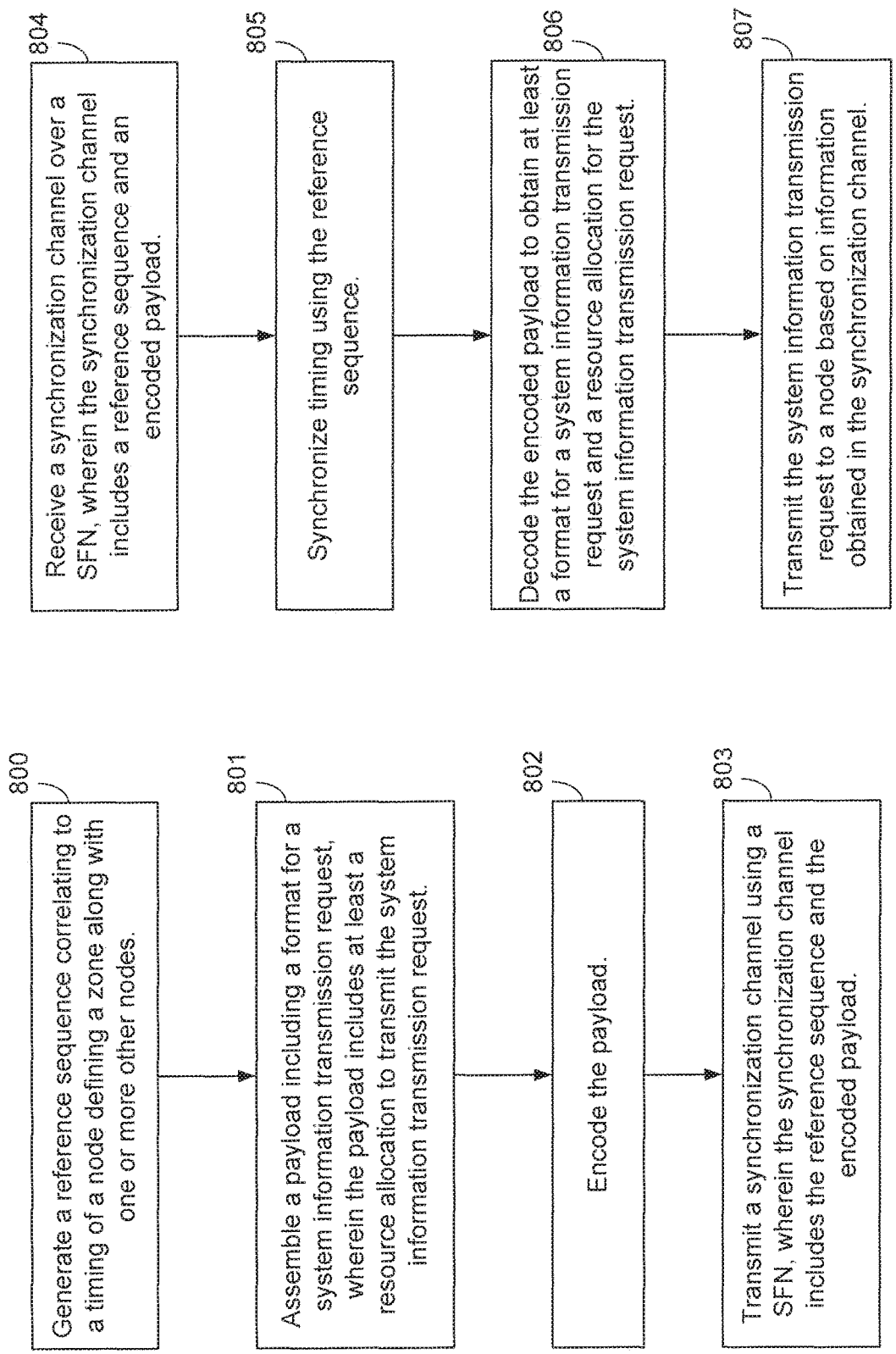

DISCOVERY AND SYNCHRONIZATION CHANNELS FOR USER-TRACKING ZONES IN A CELLULAR NETWORK

CROSS-REFERENCE TO RELATED DOCUMENTS

This application is a divisional of U.S. patent application Ser. No. 14/957,250 entitled "DISCOVERY AND SYNCHRONIZATION CHANNELS FOR USER-TRACKING ZONES IN A CELLULAR NETWORK," filed on Dec. 2, 2015, and claims the benefit of U.S. Provisional Patent Application No. 62/133,064 entitled, "DISCOVERY AND SYNCHRONIZATION CHANNELS FOR USER-TRACKING ZONES IN A CELLULAR NETWORK," filed on Mar. 13, 2015, the disclosures of which are hereby incorporated herein by reference.

BACKGROUND

Field

Aspects of the present disclosure relate generally to wireless communication systems, and more particularly, to discovery and synchronization channels for user-tracking zones in a cellular network.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance not only to meet the growing demand for mobile broadband access, but to advance and enhance the user experience with mobile communications.

SUMMARY

In one aspect of the disclosure, a method of wireless communication includes generating a reference sequence correlating to a timing of a zone node defining a zone along with one or more other zone nodes, assembling a payload including a format for a system information transmission request for a user equipment (UE), wherein the payload includes at least a resource allocation for the UE to transmit the system information transmission request, encoding the payload, and transmitting a synchronization channel using a single frequency network (SFN) across the zone, wherein the synchronization channel includes the reference sequence and the encoded payload.

In an additional aspect of the disclosure, a method of wireless communication includes receiving a SFN synchronization channel at a UE, wherein the synchronization channel includes a reference sequence and an encoded payload, synchronizing timing at the UE using the reference sequence, decoding the encoded payload to obtain at least a format for a system information transmission request and a resource allocation for the system information transmission request, and transmitting the system information transmission request to a zone node based on information obtained in the synchronization channel, wherein the system information transmission request is transmitted according to the resource allocation.

In an additional aspect of the disclosure, a method of wireless communication includes detecting a SFN synchronization channel at a UE, wherein the synchronization channel includes a reference signal and an encoded payload, extracting a zone identifier (ID) embedded in the reference signal, and in response to extracting the zone ID, synchronizing timing at the UE using the reference signal and decoding the encoded payload.

In an additional aspect of the disclosure, a method of wireless communication includes detecting a reference signal for time synchronization, synchronizing timing at a UE using the reference signal, detecting a payload associated with the reference signal in response to the synchronizing, wherein the payload includes a zone ID and an encoded payload, extracting the zone ID from the payload, and decoding the encoded payload.

In an additional aspect of the disclosure, a method of wireless communication includes generating a reference sequence correlating to a timing of a zone node defining a zone along with one or more other zone nodes, assembling a payload including a zone power class indicator, a format for a system information transmission request for a UE, and a resource allocation to transmit the system information transmission request, encoding the payload, and transmitting a synchronization channel using a SFN across the zone, wherein the synchronization channel includes the reference sequence and the encoded payload.

In an additional aspect of the disclosure, a method of wireless communication including receiving a SFN synchronization channel at a UE, wherein the synchronization channel includes a reference sequence and an encoded payload, synchronizing timing at the UE using the reference sequence, decoding the encoded payload to obtain a zone power class indicator, a format for a system information transmission request, and a resource allocation for the system information transmission request, and transmitting the system information transmission request to a zone node based on information obtained in the synchronization channel, wherein the system information transmission request is transmitted according to the resource allocation at a power associated with the zone power class indicator.

In an additional aspect of the disclosure, a method of wireless communication includes receiving a SFN first synchronization channel over a first resource at a UE, wherein the synchronization channel includes a reference sequence and an encoded payload, synchronizing timing at the UE using the reference sequence, decoding the encoded payload to obtain a first power class indicator, a format for a system information transmission request, and a first resource allocation for the system information transmission request, monitoring a second resource of the SFN for a second synchronization channel, wherein the second synchronization channel includes a second power class indicator and a second resource allocation for the system information transmission request, and transmitting the system information transmission request to a zone node based on information obtained in the synchronization channel, wherein the system information transmission request is transmitted according to the first resource allocation at a first power associated with the first power class indicator when the second synchronization channel is not detected and according to the second resource allocation at a second power associated with the second power class indicator when the second synchronization channel is detected.

In an additional aspect of the disclosure, an apparatus configured for wireless communication includes means for generating a reference sequence correlating to a timing of a zone node defining a zone along with one or more other zone nodes, means for assembling a payload including a format for a system information transmission request for a UE, wherein the payload includes at least a resource allocation for the UE to transmit the system information transmission request, means for encoding the payload, and means for transmitting a synchronization channel using a SFN across the zone, wherein the synchronization channel includes the reference sequence and the encoded payload.

In an additional aspect of the disclosure, an apparatus configured for wireless communication includes means for receiving a SFN synchronization channel at a UE, wherein the synchronization channel includes a reference sequence and an encoded payload, means for synchronizing timing at the UE using the reference sequence, means for decoding the encoded payload to obtain at least a format for a system information transmission request and a resource allocation for the system information transmission request, and means for transmitting the system information transmission request to a zone node based on information obtained in the synchronization channel, wherein the system information transmission request is transmitted according to the resource allocation.

In an additional aspect of the disclosure, an apparatus configured for wireless communication includes means for detecting a SFN synchronization channel at a UE, wherein the synchronization channel includes a reference signal and an encoded payload, means for extracting a zone II) embedded in the reference signal, and in response to extracting the zone ID, means for synchronizing timing at the UE using the reference signal and means for decoding the encoded payload.

In an additional aspect of the disclosure, an apparatus configured for wireless communication includes means for detecting a reference signal for time synchronization, synchronizing timing at a UE using the reference signal, means for detecting a payload associated with the reference signal in response to the synchronizing, wherein the payload includes a zone ID and an encoded payload, extracting the zone ID from the payload, and means for decoding the encoded payload.

In an additional aspect of the disclosure, an apparatus configured for wireless communication includes means for generating a reference sequence correlating to a timing of a zone node defining a zone along with one or more other zone nodes, means for assembling a payload including a zone power class indicator, a format for a system information transmission request for a UE, and a resource allocation to transmit the system information transmission request, means for encoding the payload, and means for transmitting a synchronization channel using a SFN across the zone, wherein the synchronization channel includes the reference sequence and the encoded payload.

In an additional aspect of the disclosure, an apparatus configured for wireless communication including means for receiving a SFN synchronization channel at a UE, wherein the synchronization channel includes a reference sequence and an encoded payload, means for synchronizing timing at the UE using the reference sequence, means for decoding the encoded payload to obtain a zone power class indicator, a format for a system information transmission request, and a resource allocation for the system information transmission request, and means for transmitting the system information transmission request to a zone node based on information obtained in the synchronization channel, wherein the system information transmission request is transmitted according to the resource allocation at a power associated with the zone power class indicator.

In an additional aspect of the disclosure, an apparatus configured for wireless communication includes means for receiving a SFN first synchronization channel over a first resource at a UE, wherein the synchronization channel includes a reference sequence and an encoded payload, means for synchronizing timing at the UE using the reference sequence, means for decoding the encoded payload to obtain a first power class indicator, a format for a system information transmission request, and a first resource allocation for the system information transmission request, means for monitoring a second resource of the SFN for a second synchronization channel, wherein the second synchronization channel includes a second power class indicator and a second resource allocation for the system information transmission request, and means for transmitting the system information transmission request to a zone node based on information obtained in the synchronization channel, wherein the system information transmission request is transmitted according to the first resource allocation at a first power associated with the first power class indicator when the second synchronization channel is not detected and according to the second resource allocation at a second power associated with the second power class indicator when the second synchronization channel is detected.

In an additional aspect of the disclosure, a computer-readable medium having program code recorded thereon. This program code includes code to generate a reference sequence correlating to a timing of a zone node defining a zone along with one or more other zone nodes, code to assemble a payload including a format for a system information transmission request for a UE, wherein the payload includes at least a resource allocation for the UE to transmit the system information transmission request, code to encode the payload, and code to transmit a synchronization channel using a SFN across the zone, wherein the synchronization channel includes the reference sequence and the encoded payload.

In an additional aspect of the disclosure, a computer-readable medium having program code recorded thereon. This program code includes code to receive a SFN synchronization channel at a UE, wherein the synchronization channel includes a reference sequence and an encoded payload, code to synchronize timing at the UE using the reference sequence, code to decode the encoded payload to obtain at least a format for a system information transmission request and a resource allocation for the system information transmission request, and code to transmit the system information transmission request to a zone node based on information obtained in the synchronization channel, wherein the system information transmission request is transmitted according to the resource allocation.

In an additional aspect of the disclosure, a computer-readable medium having program code recorded thereon. This program code includes code to detect a SFN synchronization channel at a LIE, wherein the synchronization channel includes a reference signal and an encoded payload, code to extract a zone ID embedded in the reference signal, and in response to extracting the zone ID, code to synchronize timing at the UE using the reference signal and code to decode the encoded payload.

In an additional aspect of the disclosure, a computer-readable medium having program code recorded thereon. This program code includes code to detect a reference signal for time synchronization, synchronizing timing at a UE using the reference signal, code to detect a payload associated with the reference signal in response to execution of the code to synchronize, wherein the payload includes a zone II) and an encoded payload, code to extract the zone II) from the payload, and code to decode the encoded payload.

In an additional aspect of the disclosure, a computer-readable medium having program code recorded thereon. This program code includes code to generate a reference sequence correlating to a timing of a zone node defining a zone along with one or more other zone nodes, code to assemble a payload including a zone power class indicator, a format for a system information transmission request for a UE, and a resource allocation to transmit the system information transmission request, code to encode the payload, and code to transmit a synchronization channel using a SFN across the zone, wherein the synchronization channel includes the reference sequence and the encoded payload.

In an additional aspect of the disclosure, a computer-readable medium having program code recorded thereon. This program code includes code to receive a SFN synchronization channel at a UE, wherein the synchronization channel includes a reference sequence and an encoded payload, code to synchronize timing at the UE using the reference sequence, code to decode the encoded payload to obtain a zone power class indicator, a format for a system information transmission request, and a resource allocation for the system information transmission request, and code to transmit the system information transmission request to a zone node based on information obtained in the synchronization channel, wherein the system information transmission request is transmitted according to the resource allocation at a power associated with the zone power class indicator.

In an additional aspect of the disclosure, a computer-readable medium having program code recorded thereon. This program code includes code to receive a SFN first synchronization channel over a first resource at a UE, wherein the synchronization channel includes a reference sequence and an encoded payload, code to synchronize timing at the UE using the reference sequence, code to decode the encoded payload to obtain a first power class indicator, a format for a system information transmission request, and a first resource allocation for the system information transmission request, code to monitor a second resource of the SFN for a second synchronization channel, wherein the second synchronization channel includes a second power class indicator and a second resource allocation for the system information transmission request, and code to transmit the system information transmission request to a zone node based on information obtained in the synchronization channel, wherein the system information transmission request is transmitted according to the first resource allocation at a first power associated with the first power class indicator when the second synchronization channel is not detected and according to the second resource allocation at a second power associated with the second power class indicator when the second synchronization channel is detected.

In an additional aspect of the disclosure, an apparatus includes at least one processor and a memory coupled to the processor. The processor is configured to generate a reference sequence correlating to a timing of a zone node defining a zone along with one or more other zone nodes, to assemble a payload including a format for a system information transmission request for a UE, wherein the payload includes at least a resource allocation for the UE to transmit the system information transmission request, to encode the payload, and to transmit a synchronization channel using a SFN across the zone, wherein the synchronization channel includes the reference sequence and the encoded payload.

In an additional aspect of the disclosure, an apparatus includes at least one processor and a memory coupled to the processor. The processor is configured to receive a SFN synchronization channel at a UE, wherein the synchronization channel includes a reference sequence and an encoded payload, to synchronize timing at the UE using the reference sequence, to decode the encoded payload to obtain at least a format for a system information transmission request and a resource allocation for the system information transmission request, and to transmit the system information transmission request to a zone node based on information obtained in the synchronization channel, wherein the system information transmission request is transmitted according to the resource allocation.

In an additional aspect of the disclosure, an apparatus includes at least one processor and a memory coupled to the processor. The processor is configured to detect a SFN synchronization channel at a UE, wherein the synchronization channel includes a reference signal and an encoded payload, to extract a zone ID embedded in the reference signal, and in response to extracting the zone ID, to synchronize timing at the UE using the reference signal and to decode the encoded payload.

In an additional aspect of the disclosure, an apparatus includes at least one processor and a memory coupled to the processor. The processor is configured to detect a reference signal for time synchronization, synchronizing timing at a UE using the reference signal, to detect a payload associated with the reference signal in response to execution of the configuration to synchronize, wherein the payload includes a zone ID and an encoded payload, to extract the zone ID from the payload, and to decode the encoded payload.

In an additional aspect of the disclosure, an apparatus includes at least one processor and a memory coupled to the processor. The processor is configured to generate a reference sequence correlating to a timing of a zone node defining a zone along with one or more other zone nodes, to assemble a payload including a zone power class indicator, a format for a system information transmission request for a UE, and a resource allocation to transmit the system information transmission request, to encode the payload, and to transmit a synchronization channel using a SFN across the zone, wherein the synchronization channel includes the reference sequence and the encoded payload.

In an additional aspect of the disclosure, an apparatus includes at least one processor and a memory coupled to the processor. The processor is configured to receive a SFN synchronization channel at a UE, wherein the synchronization channel includes a reference sequence and an encoded payload, to synchronize timing at the UE using the reference sequence, to decode the encoded payload to obtain a zone power class indicator, a format for a system information transmission request, and a resource allocation for the system information transmission request, and to transmit the system information transmission request to a zone node based on information obtained in the synchronization channel, wherein the system information transmission request is transmitted according to the resource allocation at a power associated with the zone power class indicator.

In an additional aspect of the disclosure, an apparatus includes at least one processor and a memory coupled to the processor. The processor is configured to receive a SFN first synchronization channel over a first resource at a UE, wherein the synchronization channel includes a reference sequence and an encoded payload, to synchronize timing at the UE using the reference sequence, to decode the encoded payload to obtain a first power class indicator, a format for a system information transmission request, and a first resource allocation for the system information transmission request, to monitor a second resource of the SiN for a second synchronization channel, wherein the second synchronization channel includes a second power class indicator and a second resource allocation for the system information transmission request, and to transmit the system information transmission request to a zone node based on information obtained in the synchronization channel, wherein the system information transmission request is transmitted according to the first resource allocation at a first power associated with the first power class indicator when the second synchronization channel is not detected and according to the second resource allocation at a second power associated with the second power class indicator when the second synchronization channel is detected.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A and 8B are block diagrams illustrating example blocks executed to implement aspects of the present disclosure.

DETAILED DESCRIPTION

Figure 1:
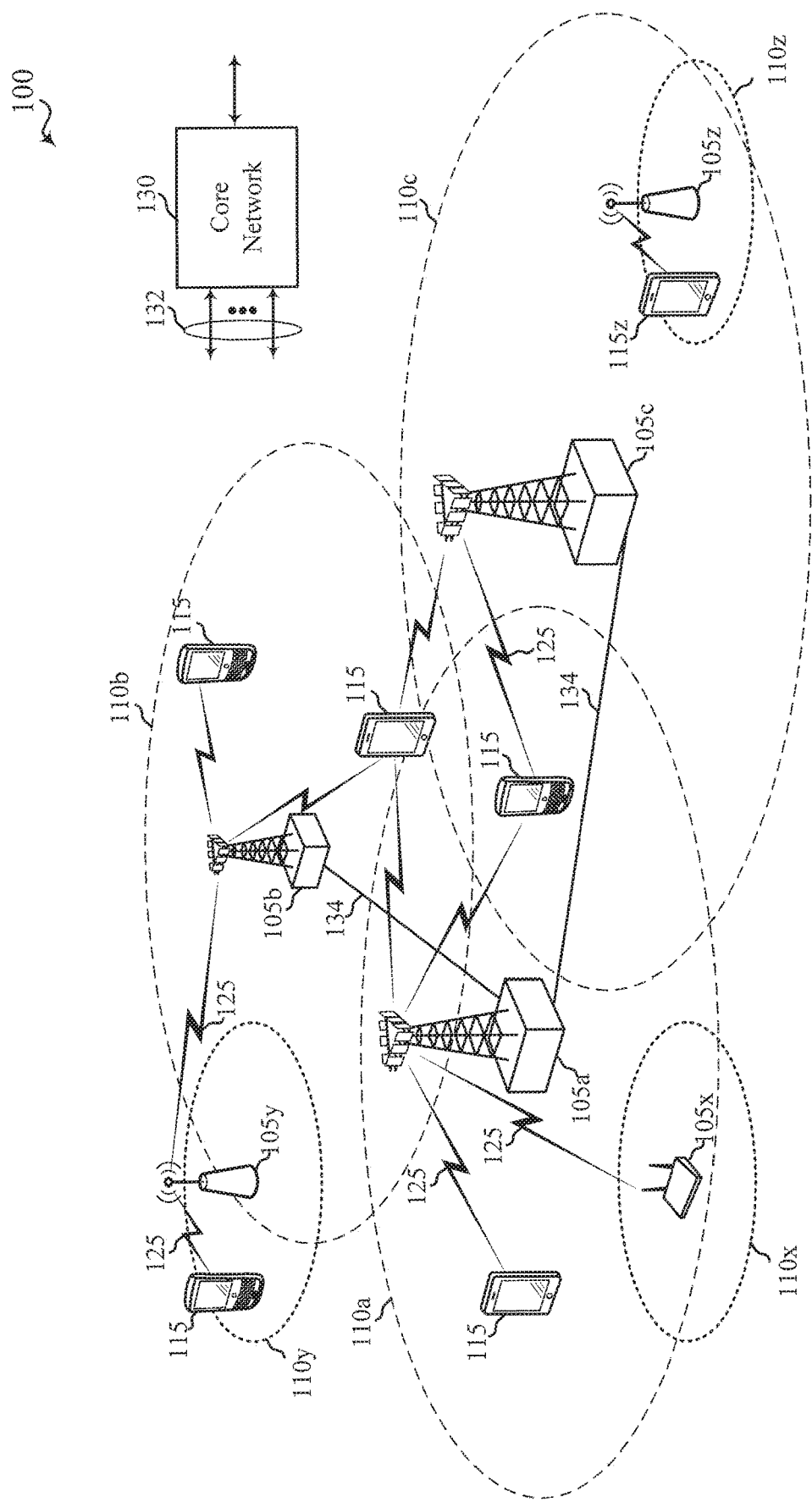
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G networks as well as other communications networks. As described herein, the terms "networks" and "systems" may be used interchangeably.

A CDMA network may implement a radio technology such as universal terrestrial radio access (UTRA), cdma2000, and the like. UTRA includes wideband-CMA (W-CDMA) and low chip rate (LCR). CDMA2000 covers IS-2000-, IS-95, and IS-856 standards.

A TDMA network may implement a radio technology such as Global System for Mobile Communications (GSM). The 3$^{rd}$ Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with the Universal Terrestrial Radio Access Network (UTRAN) that is a RAN defined as a part of the Universal Mobile Telecommunications System (UMTS), a 3G mobile phone technology supported by 3GPP. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. Certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates desired transmissions between a UE and a serving eNB, which is an eNB designated to serve the UE on the downlink and/or uplink, or desired transmission between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20MHz, respectively.

Figure 2:
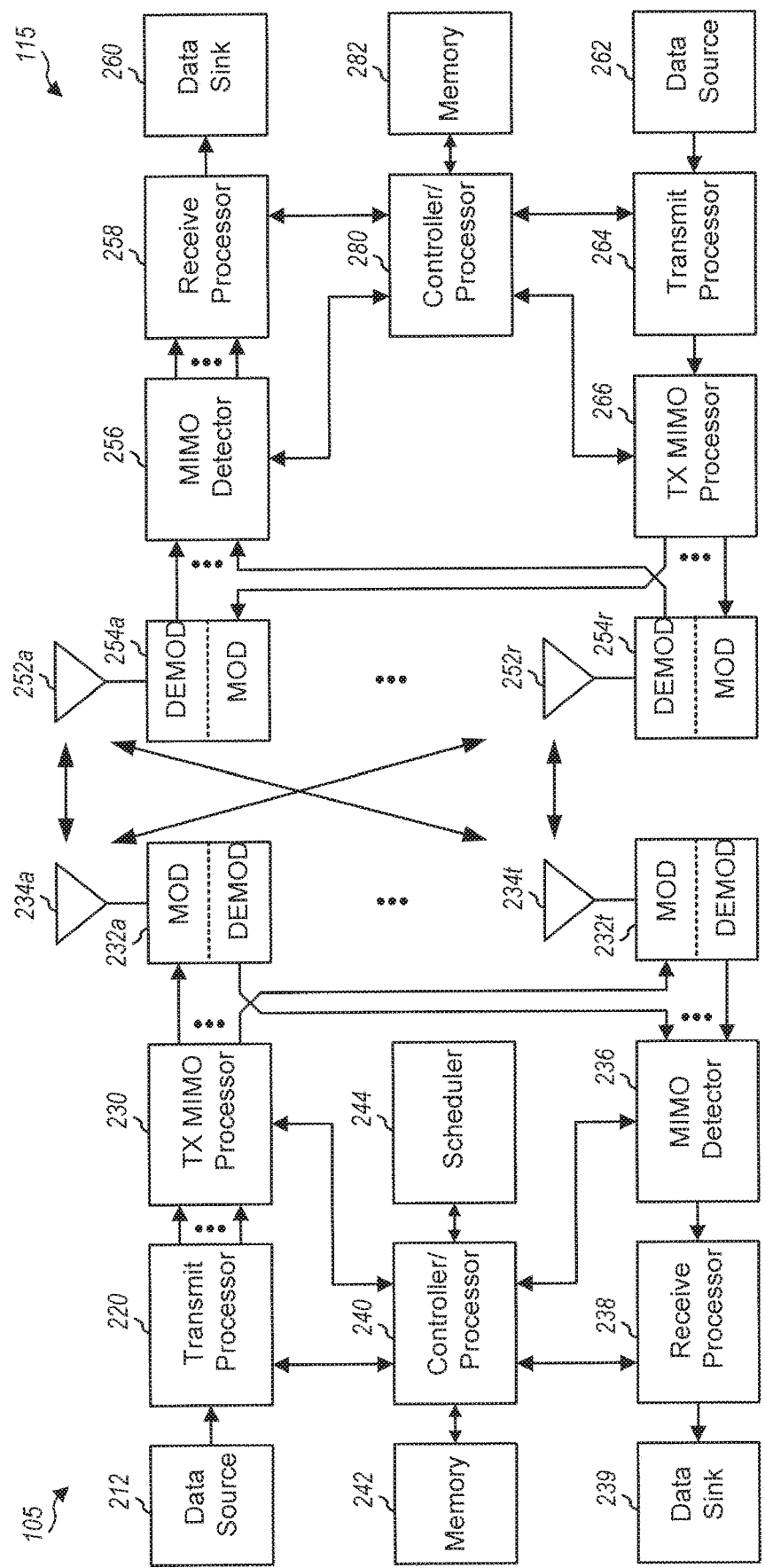
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to a controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 8A, 8B, 10A, 10B, 12A, 128, and 13, and/or other processes for the techniques described herein. The memories 242 and 282 may store data and program codes for the eNB 105 and the UE 115, respectively. A scheduler 244 may schedule UEs for data transmission on the downlink and/or uplink.

Many of today's communication systems, such as third generation (3G), fourth generation (4G), and fifth generation (5G) mobile networks provide services to mobile devices or user equipment (UEs) using a cellular or mobile network with a plurality of geographically distributed base stations or nodes. A node may include various different types of network communication entities, such as base stations, NodeBs, eNodeBs, remote radio heads (RRHs), access points, macro cells, small cells, and the like. As a UE moves in and around the nodes, it becomes important to track the location of the UE and determine which of the nodes will act as the serving node for the UE. Traditional approaches have mostly relied on the UE to take the primary responsibility for determining where the UE is topologically located in the network and to help select the serving node. These approaches typically place an expensive computational burden on the UE and often require the UE to exchange multiple messages with multiple nearby nodes before selecting the serving node. These exchanges place a significant burden on the power budget for the UE as well as the bandwidth of the network. In addition, the UE's choice of serving node may occur at the expense of overall network capability and/or efficiency. Accordingly, various aspects of the present disclosure provide for improving the tracking of UEs in a mobile network and the selection of a serving node for each UE.

In existing mobility management, a UE continually performs searches and measurements to determine the best base station to connect to for conducting wireless communications. The frequent searches and measurements consume a considerable amount of the limited power at the UE. Moreover, the network, through the base stations and access points, frequently broadcast multiple reference signals and large amounts of system information regardless of UE traffic. Accordingly, network based user-tracking can shift the burden of mobility tracking from the UE side to the network side.

Figure 3:
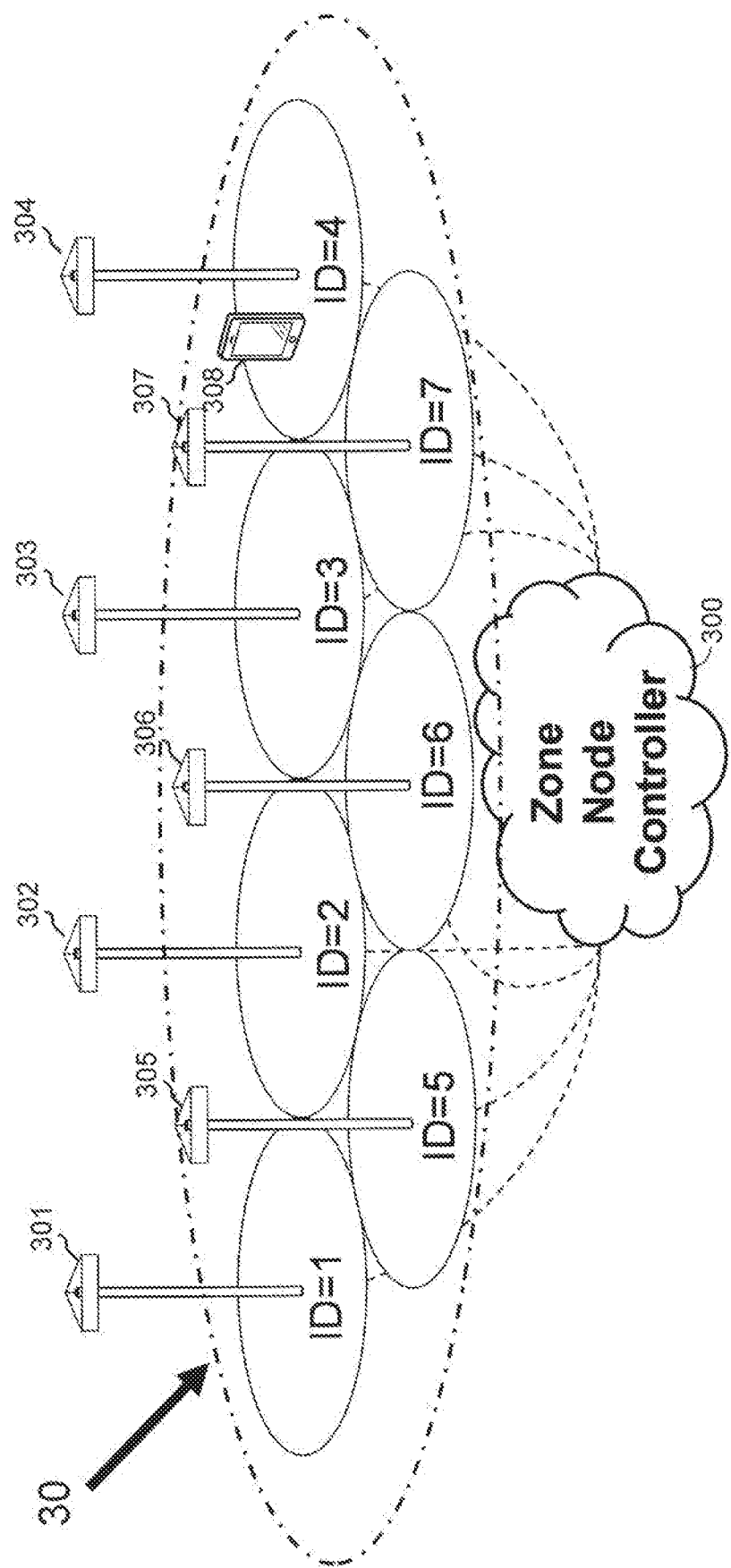
FIG. 3 is a block diagram illustrating a 5G network including multiple nodes forming a zone under control of a zone node controller.

One of the facilities supported by user-tracking zones in a cellular network includes large scale remote nodes that can be coordinated through a centralized node controller. FIG. 3 is a block diagram illustrating a user-tracking zone in a cellular network including multiple nodes 301-307 forming a zone 30 under control of a zone node controller 300. Zone node controller 300 may be implemented by a centralized component, but may also be implemented in a distributed manner with information exchange between neighboring zone nodes. Thus, while illustrated in FIG. 3 as a single centralized entity, the functionality of zone node controller 300 may be implemented through multiple different, distributed components.

In networks configured with user-tracking zones, a zone 30 is considered a set of physical nodes, such as nodes 301-307. Inter-working between nodes 301-307 is can be considered essentially seamless, including ideal backhaul, fast handover, but not necessarily coordinated multipoint (CoMP) operation. Nodes 301-307 are provided with individual node IDs, for example, node 301 is assigned node ID 1, while, node 302 is assigned node ID 2, and the like. However, over the air interface of zone 30, nodes, such as nodes 301-307, can send single frequency network (SFN) sync signals for discovery without revealing their assigned node ID. Each node in an SFN, such as nodes 301-307, can transmit the same information simultaneously using the same resource. Thus, an accessing UE, such as UE 308, would not receive the node ID of any of nodes 301-307.

Nodes 301-307 can transmit the SFN sync signal simultaneously across zone 30. The SFN sync signal may contain a reference sequence for timing acquisition. The reference signal may also be unique for each zone, which allows for inter-zone searches. In one example implementation, a multi-bit SFN sync signal may be transmitted that includes the zone ID, a time-frequency resource location, and an indication that identifies whether the system information has been updated. A time-frequency resource location may include designated frequency and slot location information. For example, the SFN sync signal transmitted by node 302 may include the zone ID of zone 30, in addition to the bandwidth and slots designated for UE chirp signal transmissions and SFN sync signal transmissions, as well as an indicator that identifies if the SIB information has changed. If the SIB change indicator identifies that the SIB information has changed, then UE 308 would send a SIB transmission request. In response to the SIB transmission request, one of nodes 301-307 will transmit the SIB to UE 308. All of the nodes in the same zone, such as nodes 301-307 of zone 30 can transmit the same SIB information. Therefore, because UE 308 does not obtain the node ID, intra-zone mobility is transparent to UEs, such as UE 308.

A UE, such as UE 308, may use the SFN sync signals to synchronize with nodes 301-307 of zone 30. If UE 308 has not already established a connection to zone 30, the initial UE chirp would request transmission of the SIB for initial acquisition. UE 308 does not necessarily request the SIB from any particular node in zone 30. Each of nodes 301-307 can transmit in the same SFN and transmit the SFN sync signals simultaneously. UE 308, which has been synchronized with nodes 301-307 of zone 30 using any of the SFN sync signals received from nodes 301-307, can send a SIB transmission request for initial acquisition. The network responds, in order to acknowledge the request, and then proceeds with a unicast SIB addressed to UE 308 in response to the transmission request.

The zone node controller (ZNC), such as ZNC 300, may choose which of nodes 301-307 is to respond. Because the same SIB information is also being transmitted by each of nodes 301-307 in zone 30, the responding node does not necessarily correspond to the node that detected the SIB transmission request. For example, UE 308 can transmit a chirp, which is detected by node 304. Node 304 can report the chirp to ZNC 300, which then can determine that node 307 will respond by transmitting the unicast SIB to UE 308.

Alternatively, one or more nodes of a zone, such as nodes 301-307 of zone 30 may autonomously determine which node will send the unicast SIB in response to the chirp. For example, nodes 301-307 can each detect the chirp transmitted by UE 308. However, node 304 may determine that it has the highest channel quality for transmissions with UE 308, thus, node 304 can autonomously elect to transmit the unicast SIB to UE 308 and inform nodes 301-303 and 305-307 via the backhaul.

Moreover, in conventional systems, mobility related measurements made by the UE may contribute to UE power consumption in idle mode discontinuous reception (IDRX) and connected mode discontinuous reception (CDRX). In contrast, because the SFN is synchronized across the active set of nodes 301-307 in zone 30 of FIG. 3, each SIB transmitted by any of nodes 301-307 will be synchronized to the same SFN in addition to including the same information. Thus, when moving across zone 30, UE 308 may transfer from node to node transparently and without performing any mobility related measurements or searches. That is, for networks that are operating user-tracking zones as described herein, the transparent mobility management can occur without UE measurements, which covers power and complexity at the UE. Moreover, because user-tracking zones in a cellular network reduce the broadcast load of its nodes, the node operational costs (OPEX) may also be reduced.

By moving tracking responsibility from the UE to the network side, power savings may be realized from the reduced searching and measurements at the UE. Additionally, a "zero" broadcast feature of user-tracking zones in a cellular network can provide substantial network-side power savings through less broadcast signaling. With "zero" broadcast, nodes do not systematically and periodically broadcast extensive SIB data regardless of UE traffic. Instead, the network can employ an on-demand system information block (SIB), in which SIB data is only unicast to a UE in response to a signal from the UE requesting such SIB transmission.

In one embodiment, in order to track UEs, the network can monitor for chirp signals transmitted periodically by UEs. A chirp signal is a short, low payload signal that includes at least the UE identifier (ID). The UE can first synchronize with the network using single frequency network (SFN) synchronization ("sync") signals transmitted by zone nodes, and then can transmit the chirp signal. Once transmitted, the UE will then listen for some kind of response. On initial access to a network, the UE chirp signal may also request transmission of SIB information in order to obtain the system information used to establish and maintain a connection with the network. Thus, the response to an initial access chirp would be the SIB information transmitted from the network.

Once network access has been established, the network will instead respond to the chirp signals with keep alive signals. Keep alive signals may include various network information that may assist the UE to maintain the connection (e.g., power control data, load balancing information, etc.), but which do not include all of the SIB data previously transmitted. After network access has been established, the UE will only request a new SIB transmission when there is an indication that the SIB information has changed, or when the UE detects it has entered a new zone of the network.

The chirp signals allow for the network to track and monitor the location of the UEs. With this tracking information, user-tracking zones in a cellular network may use unicast paging to directly page a UE when data is available. The unicast paging facilitates a more efficient paging tracking area that reduces power consumption on the network side.

Figure 4:
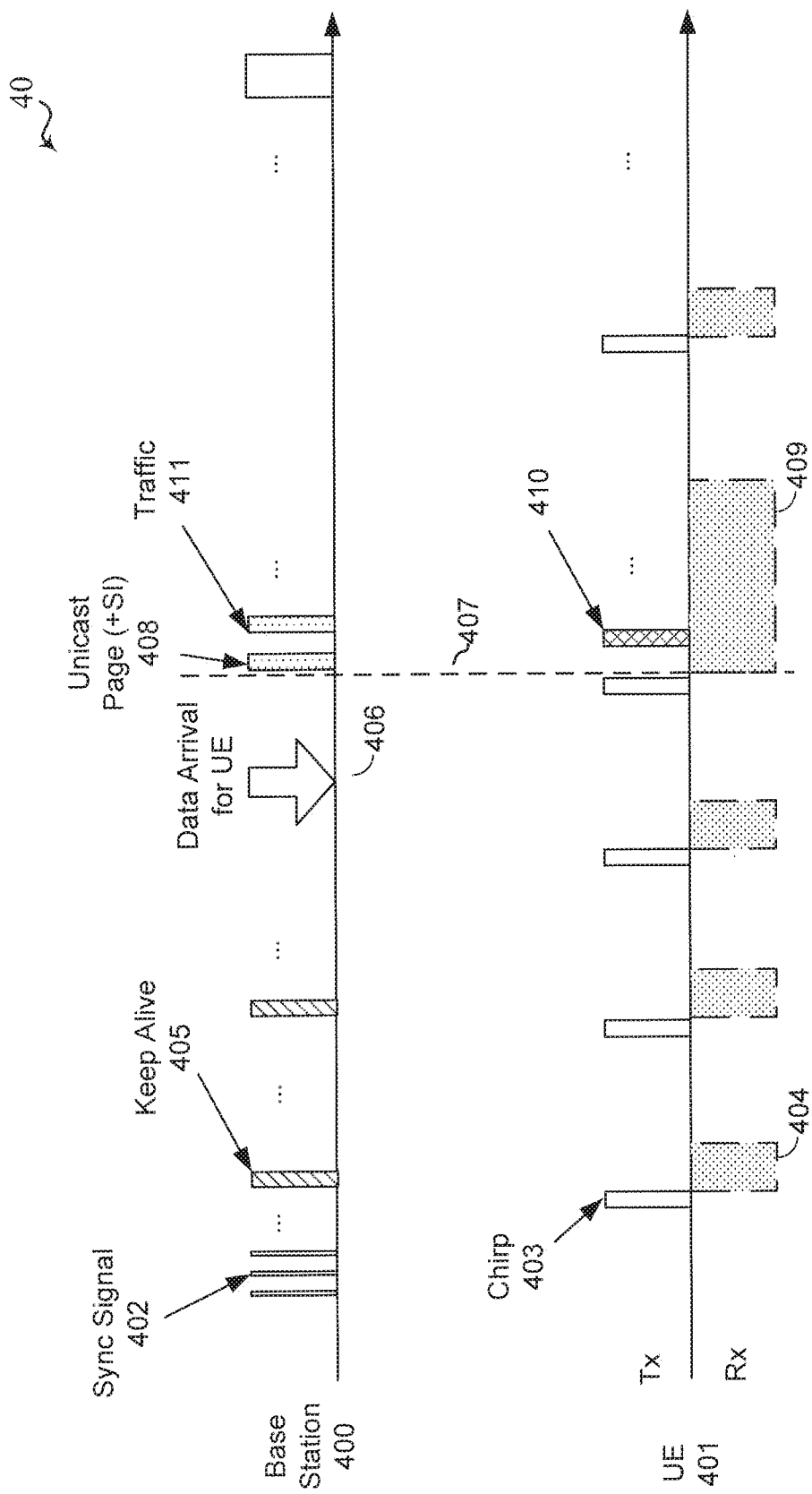
FIG. 4 is a block diagram illustrating a time line reflecting communications between a zone node and UE.

FIG. 4 is a block diagram illustrating a time line 40 that reflects communications between a zone node 400, which may include the functionality and components described with respect to base station 105 (FIG. 2), and a UE 401, which may include the functionality and components described with respect to UE 115 (FIG. 2), in a network with user-tracking zones. The network illustrated in FIG. 4 is further configured as having "zero" broadcast. Zone node 400 is one of many zone nodes supporting a zone of wireless coverage in which each node of the zone transmits in a single frequency network (SFN).

For purposes of the example illustrated in FIG. 4, UE 401 has already established a connection to the network in the zone. Zone node 400 transmits SFN sync signals 402, which can be a low duty cycle signal that includes at least a reference sequence configured to allow UE 401 to synchronize timing with zone node 400. Each of the zone nodes in the zone transmits SFN sync signals simultaneously with the same SFN. UE 401, synchronized with zone node 400, transmits chirp signal 403 that includes the UE ID of UE 401. After transmitting chirp signal 403, UE 401 begins to listen for a response during listen period 404. Zone node 400 detects chirp signal 403 and transmits keep alive signal 405 in response. Because UE 401 has already established a connection with the zone, keep alive signal 405 will include limited data that UE 401 may use to maintain the connection to the zone as noted above.

At time 406, data arrives at zone node 400 for UE 401. At time 407, zone node 400 transmits a unicast page 408 along with additional system information for UE 401. For example, the additional system information may include new resources for use in a connected mode in order to receive the data. UE 401 responds with a connected mode chirp 410 which triggers zone node 400 to begin delivering the data through traffic signals 411. UE 401 will receive the data during receive period 409.

It should be noted that various aspects of the present disclosure may provide for network-assisted zone neighbor searches based on the network-side tracking of UEs. When the network determines that the UE is close to a new or better zone, then the network may trigger a search for a new zone ID). This trigger may be included in a keep alive message, while the UE is simply chirping responses to maintain the connection.

Figure 5:
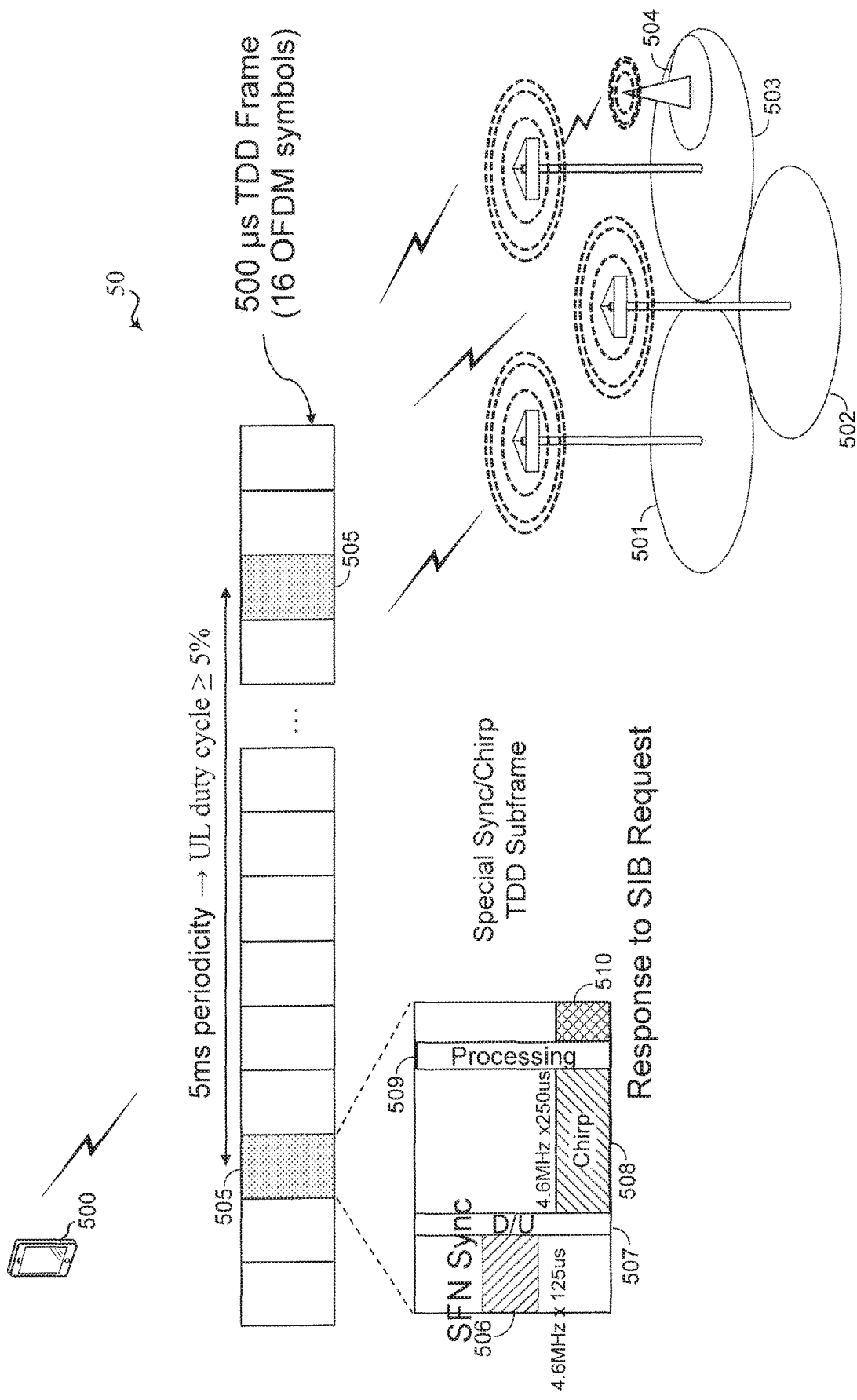
FIG. 5 is a block diagram illustrating a TDD transmission stream for communication between a UE and nodes of a zone operating within a user-tracking zone of a network.

FIG. 5 is a block diagram illustrating a TDD transmission stream 50 for communication between a UE 500 and nodes 501-504 of a user-tracking zone in cellular network. UE 500 may include similar functionality and components illustrated with respect to UE 115 (FIG. 2), while nodes 501-504 may include similar functionality and components illustrated with respect to base station 105 (FIG. 2). Within TDD transmission stream 50, special sync/chirp subframes 505 are configured to accommodate sync signal 506 transmissions from nodes 501-504 and chirp signals 508 from UEs operating within the zone, such as UE 500. Special sync/chirp subframes 505 are divided into sections to accommodate both the downlink and uplink transmissions of the interactions between UE 500 and any of nodes 501-504. The first section of special sync/chirp subframe 505 is allocated for node transmission of sync signals 506. Sync signal 506 occupies a short duration and only a portion of the available bandwidth available in subframes 505. For purposes of the illustrated example only, sync signal 506 occupies 4.6 MHz of frequency and 125 µs of bandwidth. Section 507 provides a gap that allows the transition from downlink to uplink. Chirp signal 508 also occupies only a portion of the available bandwidth of special sync/chirp subframes 505. For purposes of the illustrated example only, chirp signal 508 occupies 4.6 MHz of frequency and 250 µs of bandwidth. This chirp signal 508 is the initial UE chirp for requesting SIB transmission in a TDD operation. UE 500 is synchronized with nodes 501-504 and sends the SIB transmission request for initial acquisition through chirp signal 508. Section 509 is a processing period of time allowed for the receiving node to process chirp signal 508 and transmit a response 510 to UE 500. One of nodes 501-504 determines to transmit the response 510 in a unicast transmission to UE 500 in response to chirp signal 508. The response 510 may include a portion of the SIB transmission or the SIB transmission may be scheduled for another subframe, with response 510 simply acknowledging that the SIB transmission request was received by the network. The transmitting node may autonomously determine to transmit SIB response 510 or, alternatively, a ZNC, such as ZNC 300 (FIG. 3) may choose which of nodes 501-504 should transmit SIB response 510.

The on-demand SIB features of user-tracking zones in a cellular network may allow for minimizing UE and zone node transmission and reception requirements when there is little or no activity. This reduction of transmission and reception requirements may also serve to reduce the overall network energy consumption, which could enable scenarios in which a UE can operate efficiently as a relay. Functionally, reduced transmission/reception requirements and energy consumption may also facilitate enabling massive multiple input, multiple output (MIMO) and other types of deployments where broadcast and multi-cast operations are not available or that may be highly inefficient. Operations within user-tracking zones in a cellular network allow for zone nodes to provide only a low-periodicity beacon for initial disclosure when no devices are around. When one or a few mobile devices enter coverage within a zone, the base stations/nodes within the zone can provide system information on demand via unicast transmissions. The base stations/nodes may revert to broadcast operations, if available, as a higher number of mobile devices are present within the coverage area or if system information changes.

Figure 6:
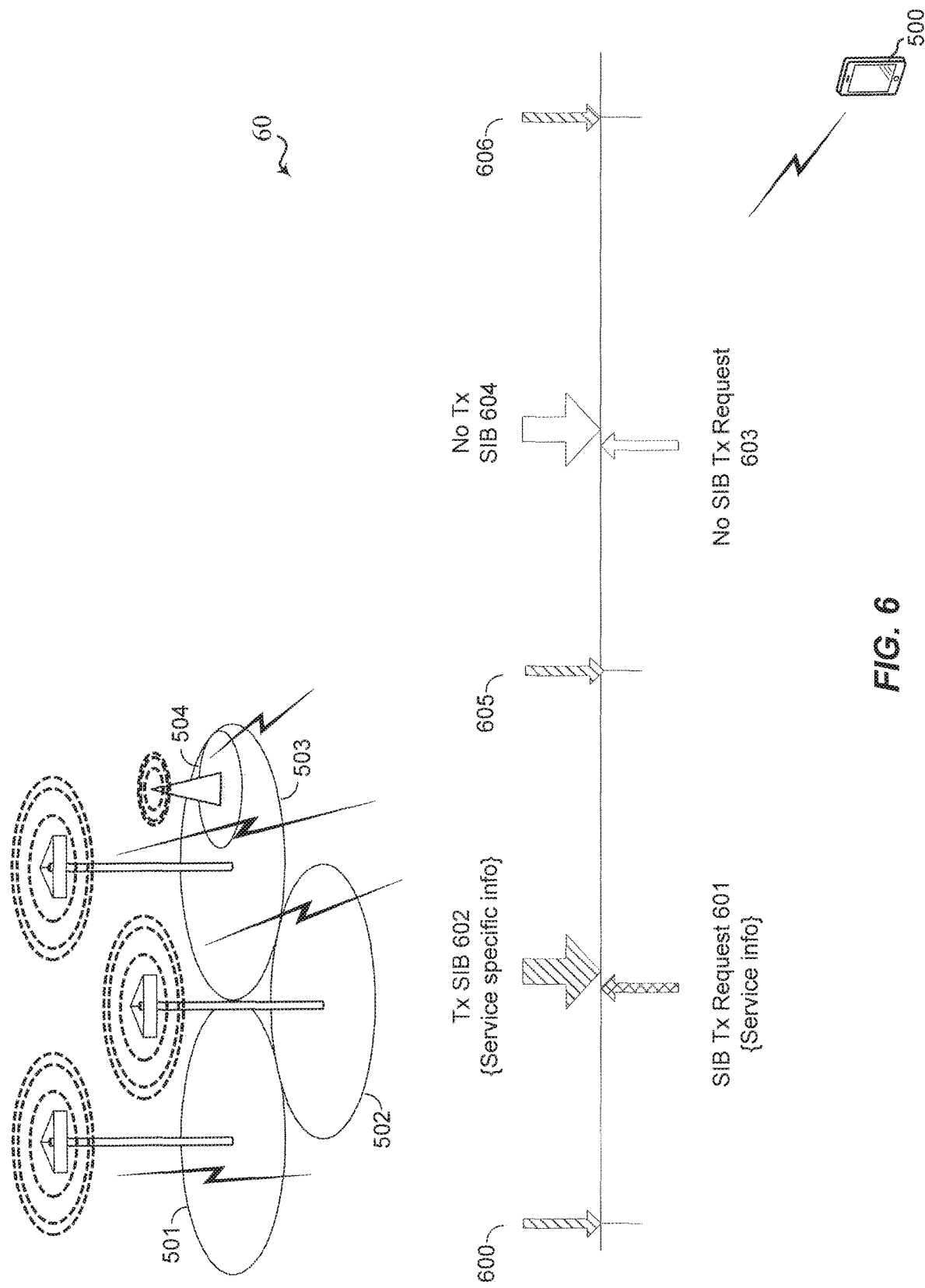
FIG. 6 is a block diagram illustrating a time line of transmissions between a UE and zone nodes operating within a user-tracking zone of a network.

FIG. 6 is a block diagram illustrating a time line 60 of transmissions between UE 500 and any of nodes 501-504 in a user-tracking zone in a cellular network. Nodes 501-504 broadcast periodic SFN sync signals 600, 605, and 606, which provides enough information for a UE, such as UE 500, to synchronize timing with nodes 501-504, to determine if UE 500 has changed zones, whether system information has changed, and where to send a SIB transmission request, such as SIB transmission request 601. SIB transmission request 601 may have a different physical (PHY) channel in some cases (e.g., for massive MIMO or mm W).

For example, UE 500 detects SFN sync signal 600 and determines either that it has entered into a new zone with nodes 501-504 or that system information within the zone of nodes 501-504 has changed. UE 500 transmits SIB transmission request 601. In some instances, when the UE 500 determines that it is entering a new zone, SIB transmission request 601 can include a request for master system information, which may include information on various services of interest. Alternatively or in addition, SIB transmission request 601 may include a request for master system information when the UE 500 determines, through SFN sync signal 600, that the system information has changed. One of nodes 501-504 responds with SIB transmission 602, which includes the specific information requested in SIB transmission request 601 (e.g., master system information, information on various available services, etc.)

Nodes 501-504 will continue to transmit SFN sync signals 605, 606. However, if UE 500 determines that it remains in the same zone or that no system information has changed since the system information communicated in SIB transmission 602, UE 500, at 603, will not transmit another SIB transmit request and, at 604, one of nodes 501-504 will not transmit another SIB or other such service information.

Figure 7:
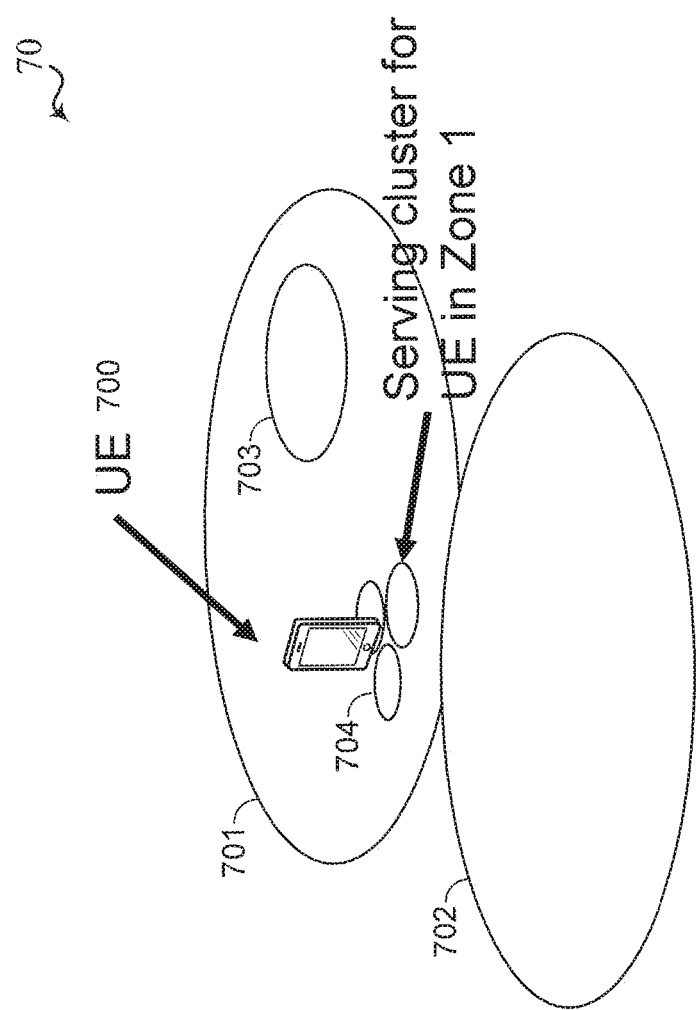
FIG. 7 is a block diagram illustrating a network area configured as a zone operating within a user-tracking zone of a network.

Different zones may be configured using nodes of various different power classes (e.g., from 40W macro nodes to 200mW small cells) and may be arranged to be adjacent to other nodes or even embedded within larger zones. FIG. 7 is a block diagram illustrating network area 70 configured with user-tracking zones. Network area 70 includes multiple zones, zone 1 701, zone 2 702, and zone 3 703. Zone 1 701 and zone 2 are adjacent to one another, while zone 3 703 is embedded within zone 1 701. Zone 1 701 includes nodes of various power classes, including small cell nodes serving UE 700 in serving cluster 704. In order for a UE, such as UE 700, to identify and distinguish between different zones, a unique SFN sync signature may be applied to the SFN sync signals of each of zones 1 701, 2 702, and 3 703. The unique SFN sync signature may include unique signaling based on time or frequency, or may also include a unique identifier in the payload associated with the particular zone. It should be noted that there is no requirement that neighboring zones are synchronized with one another.

One issue that arises with zones that are serviced by nodes of mixed power classes is the effectiveness of the power control procedure. The UE operates an open loop power control mechanism for UE chirps based on the power control information provided by the SIBs. When the identified power control is less than the power class of the node, the resulting UE chirps may undershoot the power control by providing too little power to the chirp transmissions based on the power control information. In contrast, when the identified power control is more than the power class of the node, the resulting UE chirps may overshoot the power control by providing too much power to the chirp transmission. One way to address this discrepancy is by assigning separate zone IDs to each power class with unique open loop power control mechanisms. In such aspects, all zones would have zone nodes within the same power class.

Alternatively, mixed power class nodes may reside in the same zone. However, in order to address the over/undershooting of the open loop power control for the UE chirps, additional power adjustments may be needed. For example, additional power adjustments can be included potentially in other signals, such as with the keep alive signals or secondary sync signals having a separate resource allocation, or other refinements can be used to account for the over/undershooting of the UE chirp transmit power.

It should be noted that some zones may operate as legacy regions where each node advertises its node ID through broadcast reference signals, which the UE continually receives, measures, and ranks, and may additionally report any significant changes to the tracking area. In order to inform a UE coming within coverage of a legacy region that does not operate with network based user-tracking zones after operating within such a user tracking zone, nodes of the legacy region configured according to one aspect of the present disclosure may use a special signature or legacy indicator to trigger the UE to perform a "cell" search. For example, a special signature or legacy indicator may be a predefined zone ID, such as ZoneID=0, or it may be a specific identifier, indicator, or reference signal that indicates that the zone includes legacy nodes and base stations do not actively track UE mobility. This special signature or legacy indicator will trigger the UE to perform the search. This search may also include second stage cell searching after the UE has synchronized timing with the zone.

Network assistance can reduce search complexity. The various nodes of the network already track and monitor the mobility of UEs. Therefore, when tracked UEs get near to the cell edge, the network is able to provide information that allows the UE to access the neighboring zone, similar to a neighbor list updating at the boundaries.

Various aspects of the present disclosure provide channel design for initial synchronization and discovery of user-tracking zones in a cellular network. FIG. 8A is a block diagram illustrating example blocks executed at a node of a zone to implement one aspect of the present disclosure. At block 800, a zone node generates a reference sequence correlating to the timing of the zone node defining a zone along with one or more other zone nodes. Each of the nodes of the zone will have synchronized timing.

At block 801, the zone node assembles a payload including a format for a system information transmission request for a UE, wherein the payload also includes at least a resource allocation for the UE to transmit the request. The payload may also include a zone ID, which may alternatively be embedded in the reference sequence, one or more time-frequency resource locations, which provide frequency or slots that are designated for transmission of the SFN sync signals and system information transmission requests, open loop power control information (e.g., power class, zone power class, etc.), and an update identifier which identifies when the system information for the zone has been changed or modified. The zone node can set the update identifier when changes to the system information are detected. This payload information allows the UE to disco ver the network. At block 802, the zone node encodes the payload and, at block 803, transmits a SFN synchronization channel that includes the reference sequence and the encoded payload. The SFN sync signals can be transmitted in the SFN synchronization channel accordingly.

FIG. 8B is a block diagram illustrating example blocks executed at a UE to implement one aspect of the present disclosure. At block 804, the UE receives a SFN synchronization channel that includes a reference sequence and an encoded payload. The reference sequence allows the UE, at block 805, to synchronize its timing with the zone.

Figure 9A:
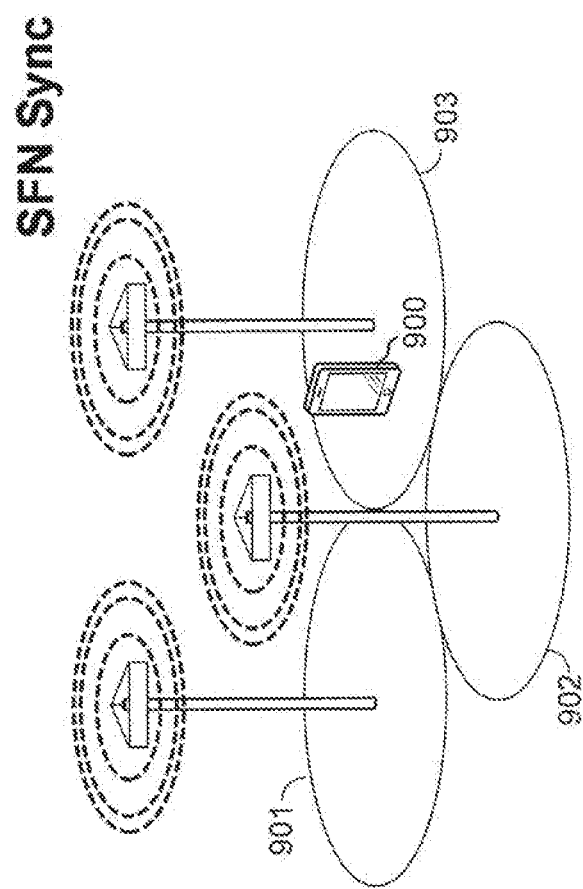
FIG. 9A is a block diagram illustrating a UE and zone nodes configured according to one aspect of the present disclosure.

At block 806, the UE decodes the encoded payload to obtain at least the format for the system information transmission request and a resource allocation over which the UE can transmit the request. The UE may decode additional information in the payload, such as zone ID, which, as noted above, may also alternatively be embedded in the reference sequence, time-frequency resource locations, open loop power control information, update identifier, and the like. At block 807, the UE may then transmit the system information transmission request based on information obtained in the payload and according to the resources and configuration information it may have decoded, FIG. 9A is a block diagram illustrating a UE 900 and zone nodes 901-903 configured according to one aspect of the present disclosure. Zone nodes 901-903 operate to define a portion of the coverage area of a designated zone. UE 900 may operate transparently within the zone served by zone nodes 901-903. UE 900 will periodically transmit chirp signals after synchronizing with zone nodes 901-903 through the SFN sync signals simultaneously transmitted by zone nodes 901-903. In one example, when UE 900 obtains the zone ID, either decoded from the payload or extracted from the reference sequence, which indicates that UE 900 has entered into a new zone, UE 900 will transmit the SIB transmission request using the allocated resources, power control, and time-frequency resource locations indicated in the encoded payload of the SFN sync signals from zone nodes 901-903.

In alternative circumstances, such as when the update indicator decoded by UE 900 from the SFN sync signal payload indicates that the system information, while UE 900 is in the same zone, has changed, UE 900 would transmit the SIB transmission request in order to obtain the new system information. The interaction by UE 900 with the zone and zone nodes 901-903 remains transparent as the actual node IDs are not transmitted or revealed to UE 900. Moreover, each of zone nodes 901-903 transmits the SFN synchronization channel with SFN sync signals simultaneously. Thus, UE 900 transparently moves through the zone.

Figure 9B:
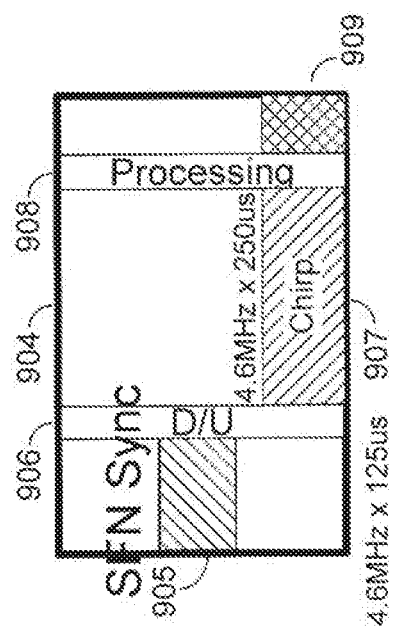
FIG. 9B is a block diagram illustrating a special subframe configured according to one aspect of the present disclosure.

FIG. 9B is a block diagram illustrating special subframe 904 configured according to one aspect of the present disclosure. Special subframe 904 is designated as a specific TDD subframe in which SFN sync signals and SIB transmission request messages may be transmitted. A UE, such as UE 900, may learn of special subframe 904 through payload information regarding time-frequency resource locations transmitted on the SFN synchronization channel by zones nodes, such as zone nodes 901-903. Section 905 of special subframe 904 carries the SFN sync signals, which include a reference sequence for timing synchronization as well as a payload containing various other system information. Section 906 provides a gap or guard period to allow the communication to change from downlink to uplink. Section 907 of special subframe 904 includes the chirp signal from the UE. In situations where the UE is initially accessing a zone or when the system information of the UE's current zone changes, the chirp signal in section 907 will include a SIB transmission request. Section 908 of special subframe 904 allows time for the zone node to process the chirp signal. The zone node may then respond to the chirp signal at section 909. In the response by the zone node, when transmitting the system information in response to a SIB transmission request, the system information may not all be transmitted during section 909. Additional subframes may be used to transmit the system information.

Additional aspects of the present disclosure are directed to multiplexing the synchronization channel across zones. In a first such aspect, single-stage zone multiplexing may be implemented in which a single-stage synchronization signal is transmitted with the zone ID embedded within the SFN sync signal using, for example, a unique scrambling code or sequence or time/frequency assignment.

Figures 10A, 10B:
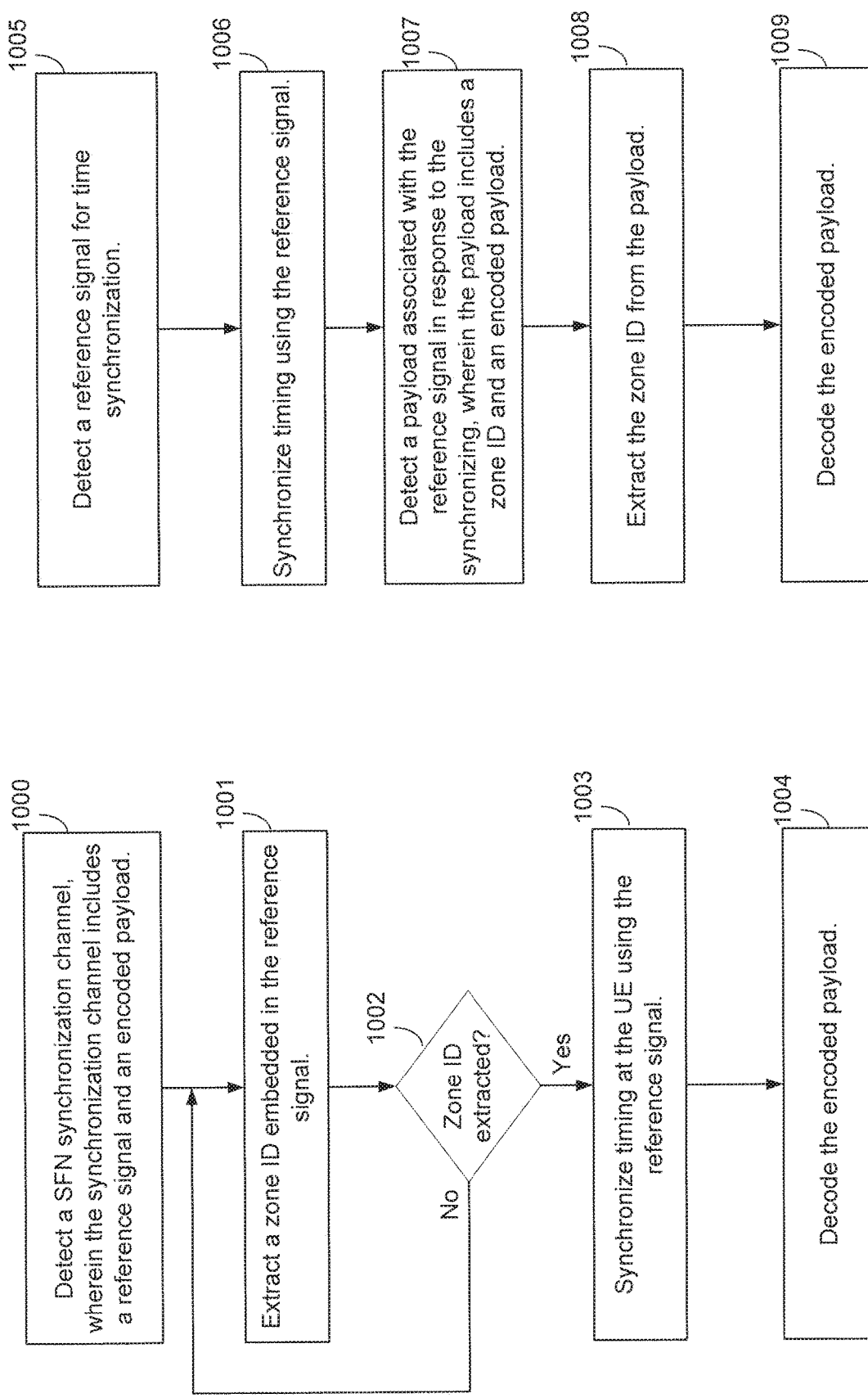
FIGS. 10A and 10B are block diagrams illustrating example blocks executed to implement aspects of the present disclosure.

FIG. 10A is a block diagram illustrating example blocks executed by a zone node to implement one aspect of the present disclosure. At block 1000, a UE detects a SFN synchronization channel that includes a reference signal and encoded payload. At block 1001, the UE extracts a zone ID embedded in the reference signal. The zone ID may be embedded in the reference signal using a unique scrambling code or time/frequency assignment.

At block 1002, a determination is made whether the correct or expected zone ID has been extracted. In operation, the UE will search across each zone ID and/or time offset hypothesis to detect the zone ID embedded in the reference signal. Thus, the UE may detect a zone ID for a zone that it does not wish to access. If the correct or expected zone ID has not been extracted, then, the UE will continue extracting zone IDs, at block 1001. Otherwise, if the correct or expected zone ID has been extracted, at block 1003, the UE will synchronize its timing using the reference signal. At block 1004, the UE will then decode the encoded payload. The payload may include a format for a SIB transmission request that may also be scrambled using the zone ID. The UE may decode the encoded payload to obtain at least the format for the SIB transmission request and a resource allocation for the system information transmission. The format for the SIB transmission request may be descrambled from the encoded payload using the zone ID.

In another aspect of the disclosure, a two-stage signal is provided. First the SFN timing reference signal is the same for all zones, which enables initial timing synchronization to occur. FIG. 10B is a block diagram illustrating example blocks executed to implement one aspect of the present disclosure. At block 1005, the UE detects a reference signal for time synchronization and, at block 1006, synchronizes its timing using the reference signal. As noted, the reference signal is the same for all zones. Therefore, the UE may synchronize timing without decoding or descrambling the reference signal.

At block 1007, in response to the synchronizing, the UE detects a payload that includes a zone ID and an encoded payload. The UE may then extract the zone ID, at block 1008, and decode the payload, at block 1009. As with the single-stage signal, some of the information encoded into the payload may further be scrambled with the zone ID.

Additionally, the UE, whether operating with a single-stage signal, as illustrated in FIG. 10A, or a two-stage signal, as illustrated in FIG. 10B, may detect a legacy indicator within the synchronization channel. As noted above, a legacy indicator identifies zones that are not compatible with operations of user-tracking zones in a cellular network. If detected, the UE will refrain from performing the features associated with user-tracking operations and revert to legacy cell search operations.

The SFN sync signal payload may include power control information for the open loop power control procedures used by the UEs. Various aspects of the present disclosure may provide for accommodating multiple power classes. In certain aspects, multiple power classes are accommodated in a single zone, while in other aspects, each zone will include only a single power class of node.

Figure 11:
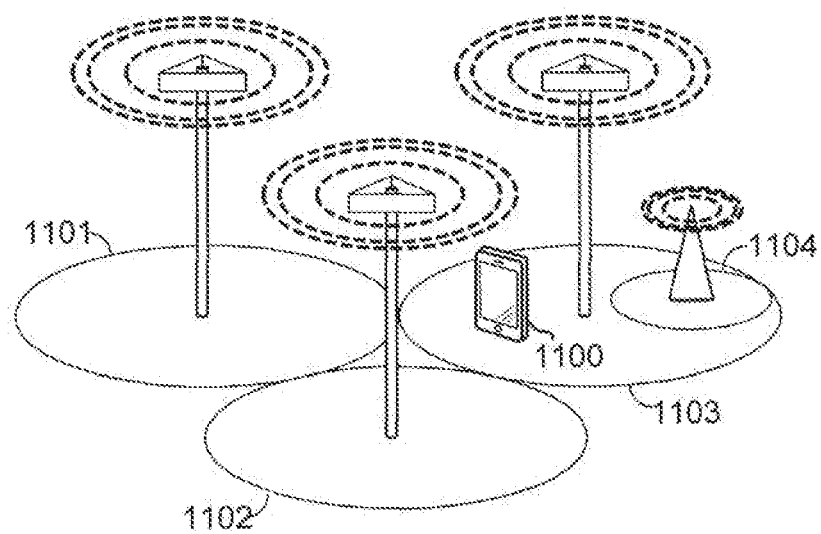
FIG. 11 is a block diagram illustrating a UE and zone nodes configured according to one aspect of the present disclosure.

FIG. 11 is a block diagram illustrating UE 1100 and zone nodes 1101-1104 configured according to one aspect of the present disclosure. Zone nodes 1101-1104 are each within the same zone. However, the power class of zone nodes 1101-1103 is different than the power class of zone node 1104. Because the same SIB and sync signals are transmitted by each node in a zone, each of zone nodes 1101-1104 advertises only a single power class in the payload of the SFN sync signal. Thus, UE 1100 will receive the same SFN sync signal from zone node 1103 and 1104 even though their actual power class is different. If the higher power class of zone nodes 1101-1103 is used, then when transmitting the chirp signal or a SIB transmission request to zone node 1104, the power used for transmitting to zone node 1104 will overshoot the node. Overshooting the node refers to using too much power in the transmission to a particular node. Conversely, if the lower power class of zone node 1104 is used for the entire zone, then the power used for transmissions to zone nodes 1101-1103 will undershoot those nodes. Undershooting refers to using too little power in the transmission to a particular node. Undershooting may affect the reliability of the node successfully receiving the transmitted signal, while overshooting may cause too much interference to competing signals.

Figure 12:
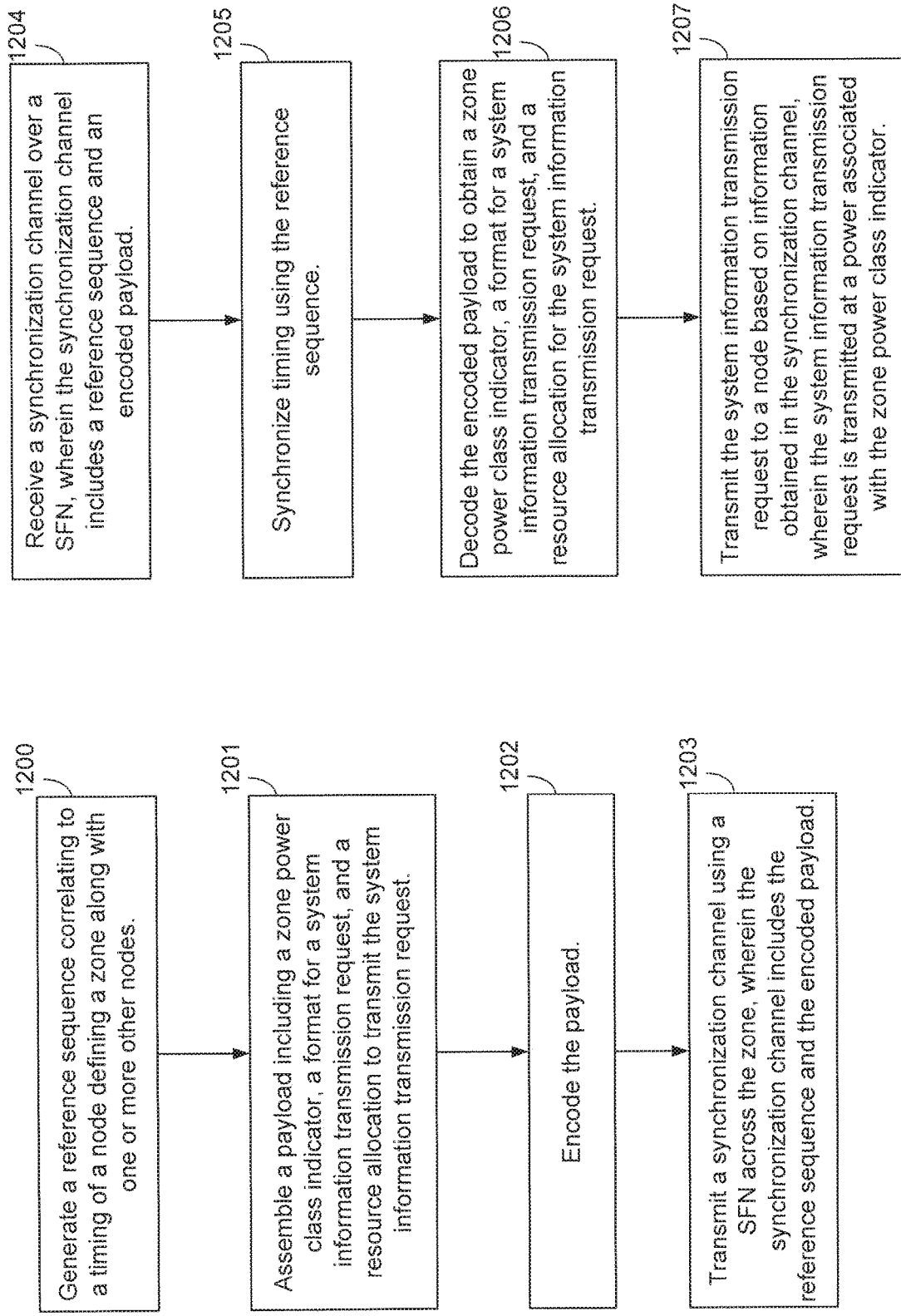
FIGS. 12A and 12B are block diagrams illustrating example blocks executed to implement aspects of the present disclosure.

FIG. 12A is a block diagram illustrating example blocks executed by a zone node to implement one aspect of the present disclosure. At block 1200, a zone node generates a reference sequence correlating to a timing of the zone node and other zone nodes defining a zone. At block 1201, the zone node assembles a payload that includes at least a zone power class indicator, a format for a system information transmission request, and a resource allocation for transmitting the request. In certain aspects, the zone power class indicator identifies the only power class of zone nodes for the zone. In such aspects, all nodes in the same zone will have the same power class.

In additional aspects, the zone power class indicator selects a certain power class to advertise through the payload, even though zone nodes of different power classes may populate the zone. In such aspects, the payload may also include power modification instructions that instruct the UE on how to modify the power control when a power class of the particular zone node is different than the zone power class.

At block 1202, the zone node encodes the payload and, at block 1203, transmits a SFN synchronization channel that includes the reference sequence and encoded payload.

FIG. 12B is a block diagram illustrating example blocks executed by a UE to implement one aspect of the present disclosure. At block 1204, a UE receives a SFN synchronization channel that includes a reference sequence and an encoded payload. At block 1205, the UE uses the reference sequence to synchronize its timing to the zone node.

At block 1206, the UE decodes the encoded payload to obtain at least the zone power class indicator, a format for the system information transmission request, and a resource allocation for the request. Under scenarios in which the UE will send the SIB transmission request, the UE will set its transmit power according to a power associated with the zone power class indicator and then transmit, at block 1207, the SIB transmission request at the indicated power over the allocated resources.

In scenarios with zone nodes of multiple different power classes defining a zone, the payload will also include a power modification instruction. When the power class of the zone node does not match the zone power class, the UE will receive a power mismatch indicator. The power mismatch indicator will be a signal from the zone node that the transmitted power was either too high or too low. In response to this power mismatch indicator, the UE will use the power modification instruction to adjust the power accordingly. The zone power class may be selected to always reflect the highest or lowest power class of the nodes in the zone. Thus, the power modification instruction may be fixed in advance to adjust the power either up, in cases where the lowest power class is always advertised as the zone power class, or down, in cases where the highest power class is always advertised as the zone power class.

Additional aspects of the disclosure may provide for separate messages for different power classes. In one such example aspect, zone nodes with different power classes are simply only included in zones with other zone nodes having the same power class. In such cases, each zone will still have its own SIB and SFN synchronization channel. However, additional example aspects may provide for separate power class advertising for different power classes in the same zone, with the consideration that the SFN transmission is still maintained across power classes.

Figure 13:
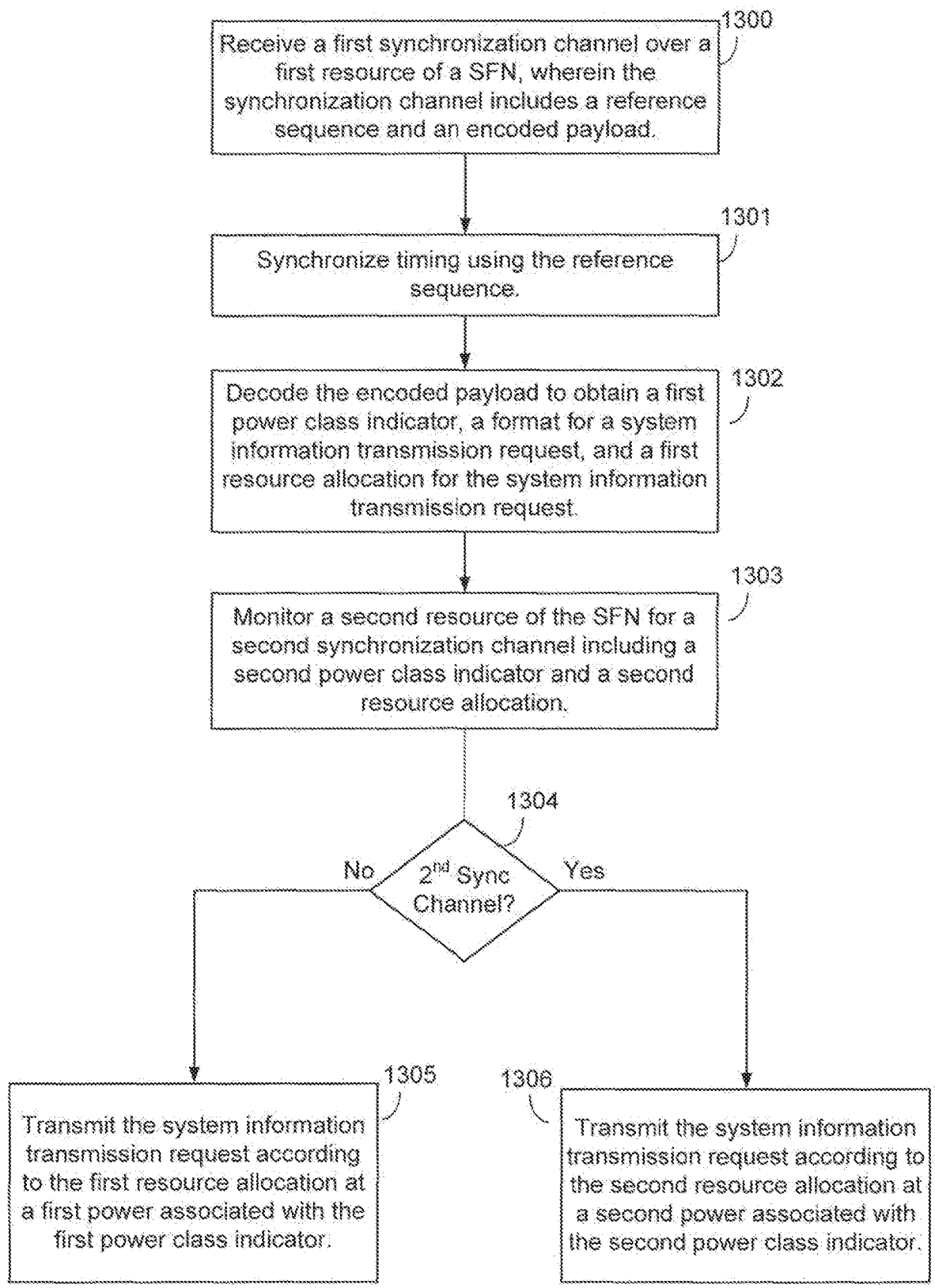
FIG. 13 is a block diagram illustrating example blocks executed to implement one aspect of the present disclosure.

FIG. 13 is a block diagram illustrating example blocks executed to implement one aspect of the present disclosure. At block 1300, a UE receives a SFN synchronization channel that includes a reference sequence and an encoded payload. The reference sequence allows the UE, at block 1301, to synchronize its timing with the zone.

At block 1302, the UE decodes the encoded payload to obtain at least a first power class indicator, a format for the system information transmission request, and a resource allocation over which the UE can transmit the request.

At block 1303, the UE monitors a second resource of the SFN for a second synchronization channel that includes a second power class indicator and a second resource allocation for transmitting the system information transmission request. The second resource of the SFN may be frequency division multiplexed (FDM) from the first SFN resource that the first SFN synchronization channel was received.

At block 1304, a determination is made whether the UE detected such a second synchronization channel in a second resource of the SFN. If no such second sync channel is detected, then, at block 1305, the UE transmits the system information transmission request according to the first resource allocation at a first power associated with the first power class indicator. In other words, if the UE does not detect the secondary resource of the SFN for the zone nodes (e.g., sent from a small cell), then it will transmit according to the power class advertised in the first sync signal. Otherwise, if a second synchronization channel is detected at the second resource of the SFN, then, at block 1306, the UE transmits the system information transmission request according to the second resource allocation at a second power associated with the second power class indicator. In other words, if the UE detects a secondary resource (e.g., sent from a small cell), it will transmit to accommodate the second power class. The same SIB information would be provided regardless of whether the first or second power class is used, only the power and resource allocation would change.

Figure 14:
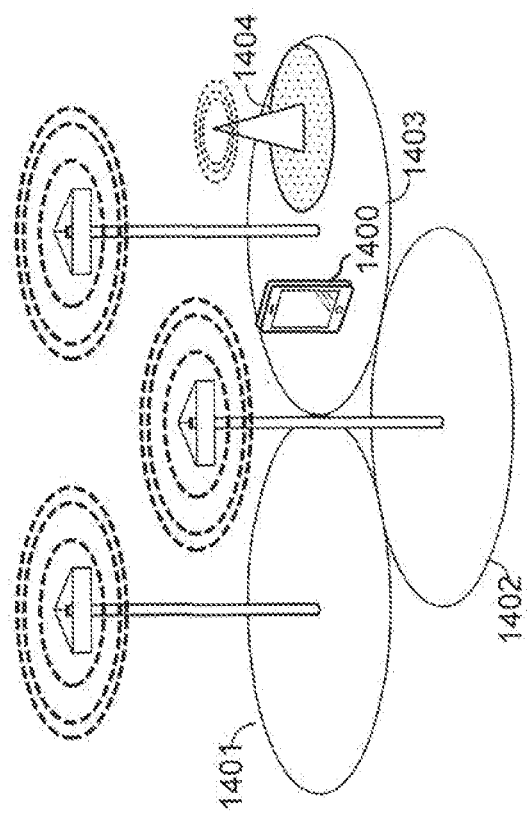
FIG. 14 is a block diagram illustrating a UE and zone nodes configured according to one aspect of the present disclosure.

FIG. 14 is a block diagram illustrating a UE 1400 and zone nodes 1401-1404 configured according to one aspect of the present disclosure. Zone nodes 1401-1404 are a part of the same zone. However, zone nodes 1401-1403 each have the same power class, while zone node 1404 is a small cell and has a different power class. According to the described example, while zone node 1404 will transmit the same system information and transmit the SFN sync signals simultaneously with zone nodes 1401-1403, zone node 1404 also transmits a secondary SFN sync signal that is FDM with the primary SFN sync signal sent by zone nodes 1401-1403. As UE 1400 travels through the zone, when it detects the SFN sync signals, it will also monitor for the secondary sync signal at the secondary resource of the SFN. The detection of the secondary sync signal indicates to UE 1400 that the zone node is at a different power class. Therefore, when transmitting, the UE 1400 will set power according to the different power class instead of the power class advertised in the first resources of the SFN sync signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8A, 8B, 10A, 10B, 12A, 12B, and 13 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting a synchronization channel over a single frequency network (SFN) at a user equipment (UE), wherein the synchronization channel includes a reference signal and an encoded payload;
   extracting a zone identifier (ID) embedded in the reference signal, wherein the extracting includes searching the synchronization channel using available predefined zone IDs and available time offsets until detecting the zone ID; and
   in response to extracting the zone ID:
      synchronizing timing at the UE using the reference signal; and
      decoding the encoded payload.

2. The method of claim 1, wherein the zone ID is extracted using one or more of:
   a unique scrambling code; and
   a predetermined time/frequency.

3. The method of claim 1, wherein the decoding includes:
   decoding the encoded payload to obtain at least a format for a system information transmission request and a resource allocation for the system information transmission request.

4. The method of claim 3, wherein the format for the system information transmission request is further descrambled from the encoded payload using the zone ID.

5. The method of claim 1, further including:
   detecting a legacy indicator in the synchronization channel; and
   in response to the legacy indicator:
      skipping the synchronizing and the decoding; and
      performing cell search of neighboring cells for connection.

6. The method of claim 5, wherein the legacy indicator includes one of:
   a predetermined zone ID;
   a legacy reference signal; or
   a legacy status indicator.

7. A method of wireless communication, comprising:
   detecting a reference signal for time synchronization;
   synchronizing timing at a user equipment (UE) using the reference signal; and
   detecting a payload associated with the reference signal in response to the synchronizing,
      wherein the payload includes a zone identifier (ID) and an encoded payload;
   extracting the zone ID from the payload; and
   decoding the encoded payload to obtain a format for a system information transmission request, wherein the format for the system information transmission request is descrambled from the encoded payload using the zone ID.

8. The method of claim 7, wherein the decoding the encoded payload includes:
   decoding the encoded payload to further obtain a format for a resource allocation for the system information transmission request.

9. The method of claim 7, further including:
   detecting a legacy indicator associated with the reference signal; and
   in response to the legacy indicator:
      skipping the decoding the encoded payload; and
      performing cell search of neighboring cells for connection.

10. The method of claim 9, wherein the legacy indicator includes one of:

a predetermined zone ID;
a legacy reference signal; or a legacy status indicator.

11. An apparatus configured for wireless communication, comprising:
means for detecting a synchronization channel over a single frequency network (SFN) at a user equipment (UE), wherein the synchronization channel includes a reference signal and an encoded payload;
means for extracting a zone identifier (ID) embedded in the reference signal, wherein the means for extracting includes means for searching the synchronization channel using available predefined zone IDs and available time offsets until detecting the zone ID; and
in response to extracting the zone ID:
means for synchronizing timing at the UE using the reference signal; and
means for decoding the encoded payload.

12. The apparatus of claim 11, wherein the zone ID is extracted using one or more of:
a unique scrambling code; and
a predetermined time/frequency.

13. The apparatus of claim 11, wherein the means for decoding includes:
means for decoding the encoded payload to obtain at least a format for a system information transmission request and a resource allocation for the system information transmission request.

14. The apparatus of claim 13, wherein the format for the system information transmission request is further descrambled from the encoded payload using the zone ID.

15. The apparatus of claim 11, further including:
means for detecting a legacy indicator in the synchronization channel; and
in response to the legacy indicator:
means for skipping the means for synchronizing and the means for decoding; and
means for performing cell search of neighboring cells for connection.

16. The apparatus of claim 15, wherein the legacy indicator includes one of:
a predetermined zone ID;
a legacy reference signal; or
a legacy status indicator.

17. An apparatus configured for wireless communication, comprising:
means for detecting a reference signal for time synchronization;
means for synchronizing timing at a user equipment (UE) using the reference signal; and
means for detecting a payload associated with the reference signal in response to the means for synchronizing, wherein the payload includes a zone identifier (ID) and an encoded payload;
means for extracting the zone ID from the payload; and
means for decoding the encoded payload to obtain a format for a system information transmission request, wherein the format for the system information transmission request is descrambled from the encoded payload using the zone ID.

18. The apparatus of claim 17, wherein the means for decoding the encoded payload includes:
means for decoding the encoded payload to further obtain a format for a resource allocation for the system information transmission request.

19. The apparatus of claim 17, further including:
means for detecting a legacy indicator associated with the reference signal; and in response to the legacy indicator:
means for skipping the means for decoding the encoded payload; and
means for performing cell search of neighboring cells for connection.

20. The apparatus of claim 19, wherein the legacy indicator includes one of:
a predetermined zone ID;
a legacy reference signal; or
a legacy status indicator.

21. A non-transitory computer-readable medium having program code recorded thereon, comprising:
program code for causing a computer to detect a synchronization channel over a single frequency network (SFN) at a user equipment (UE), wherein the synchronization channel includes a reference signal and an encoded payload;
program code for causing the computer to extract a zone identifier (ID) embedded in the reference signal, wherein program code causing the extraction includes program code for causing the computer to search the synchronization channel using available predefined zone IDs and available time offsets until detecting the zone ID; and
executable in response to extracting the zone ID:
program code for causing the computer to synchronize timing at the UE using the reference signal; and
program code for causing the computer to decode the encoded payload.

22. A non-transitory computer-readable medium having program code recorded thereon, comprising:
program code for causing a computer to detect a reference signal for time synchronization;
program code for causing the computer to synchronize timing at a user equipment (UE) using the reference signal; and
program code for causing the computer to detect a payload associated with the reference signal in response to the program code for causing the computer to synchronize, wherein the payload includes a zone identifier (ID) and an encoded payload;
program code for causing the computer to extract the zone ID from the payload; and
program code for causing the computer to decode the encoded payload to obtain a format for a system information transmission request, wherein the format for the system information transmission request is descrambled from the encoded payload using the zone ID.

23. An apparatus configured for wireless communication, the apparatus comprising:
at least one processor; and
a memory coupled to the at least one processor,
wherein the at least one processor is configured:
to detect a synchronization channel over a single frequency network (SFN) at a user equipment (UE), wherein the synchronization channel includes a reference signal and an encoded payload;
to extract a zone identifier (ID) embedded in the reference signal, wherein the extraction includes for the at least one processor to search the synchronization channel using available predefined zone IDs and available time offsets until detecting the zone ID; and
in response to extracting the zone ID:
to synchronize timing at the UE using the reference signal; and
to decode the encoded payload.

24. An apparatus configured for wireless communication, the apparatus comprising:
   at least one processor; and
   a memory coupled to the at least one processor,
   wherein the at least one processor is configured:
      to detect a reference signal for time synchronization;
      to synchronize timing at a user equipment (UE) using the reference signal; and
      to detect a payload associated with the reference signal in response to synchronization of the timing, wherein the payload includes a zone identifier (ID) and an encoded payload;
      to extract the zone ID from the payload; and
      to decode the encoded payload to obtain a format for a system information transmission request, wherein the format for the system information transmission request is descrambled from the encoded payload using the zone ID.

* * * * *